United States Patent [19]

Geberth, Jr.

[11] Patent Number: 4,840,543

[45] Date of Patent: Jun. 20, 1989

[54] CLUTCH APPARATUS FOR RAPID POWER SOURCE CONVERSION

[76] Inventor: John D. Geberth, Jr., 10 Goose Cove La., Ramsey, N.J. 07446

[21] Appl. No.: 230,594

[22] Filed: Aug. 10, 1988

[51] Int. Cl.$^4$ .................. F04B 17/00; F16D 27/06
[52] U.S. Cl. .................. 417/223; 417/319; 417/374; 417/420; 192/84 C; 192/110 B
[58] Field of Search ............ 417/223, 374, 410, 319, 417/420; 192/84 C, 84 B

[56] References Cited

U.S. PATENT DOCUMENTS

| | | | |
|---|---|---|---|
| 887,252 | 5/1908 | Jackson | 417/420 |
| 2,812,895 | 11/1957 | Peeps | 417/234 |
| 4,293,281 | 10/1981 | Lamoreaux | 417/374 |
| 4,296,851 | 10/1981 | Pierce | 192/84 C |

Primary Examiner—Carlton R. Croyle
Assistant Examiner—David Scheuermann
Attorney, Agent, or Firm—Collard, Roe & Galgano

[57] ABSTRACT

There is provided a mechanism or system for use with a motor driven mechanism, such as a pump for pressurizing paint for spray painting purposes, which permits conversion of the power source therefor between an electric motor and an internal combustion engine, each of which being capable of directly driving the motor driven mechanism. The mechanism or system includes a commonly shared clutch mechanism which is controlled such that the clutch is engaged and the pump operated until the operating level is reached at which time the clutch is disengaged so that the electric motor or internal combustion engine is under no load. The clutch mechanism utilizes a magnetic clutch and the clutch driven plate is non-rotatably connected to the pump input shaft while the clutch drive plate in non-rotatably connected to the motor or engine output shaft. The clutch drive plate is splined or keyed onto the engine or motor output shaft and is interchangeable between the output shafts of the electric motor and internal combustion engine. The electromagnetic coil, when energized, magnetically draws the clutch drive plate towards the clutch driven plate and causes the two plates to engage with one another.

11 Claims, 7 Drawing Sheets

CLUTCH APPARATUS FOR RAPID POWER SOURCE CONVERSION

The present invention relates generally to an apparatus for permitting the conversion of the power source for a motor driven mechanism. More specifically, the present invention relates to a conversion apparatus which permits the power source of a motor driven mechanism, such as a pump, to be changed or converted to that power can be provided directly either by an electric motor or an internal combustion engine.

In the case of pumps used for hydraulic paint spraying operations, both electric motor driven pumps, as well as internal combustion (I.C.) engine driven pumps are available in the market. With respect to the electric motor driven pumps, the pressure of the fluid paint is measured in order to control the operation of the electric motor so that when the pressure of the paint reaches the operating pressure level, a pressure switch senses this high pressure and sends a signal to the electric motor to stop and, when the pressure switch senses the predetermined low pressure for the paint, it sends a signal to the motor to start so as to drive the airless paint pump and increase the pressure of the liquid paint. However, in the case of the I.C. engine driven pump, the engine must run continuously and cannot be shut off and restarted in the same manner as the electric motor. In this case, a clutch is utilized which is engaged when it is necessary for the engine to drive the pump and disengaged when the pressure of the fluid paint has reached its operating pressure level. Thus, where electrical service is available, the electric motor driven airless paint spray pump can be utilized for painting purposes. However, many times such painting is done at new construction sites or other locations where electrical service may not be available, so that the I.C. engine driven pump is required. Hence, a painting contractor, in order to insure that he has the proper equipment for the conditions of the job in which the finds himself, must have both the electric motor driven pump as well as the I.C. engine driven pump. Attempts at producing a pump for hydraulic painting purposes, which is convertible between electric motor operation and I.C. engine operation, have not met with great success, particularly since such arrangements have resulted in large and cumbersome pieces of equipment.

It is, therefore, a primary object of the present invention to provide a motor driven mechanism, such as a pump utilized in hydraulic or airless paint spraying, which can be driven by an electric motor where electrical service is available or an I.C. engine where electrical service is unavailable and wherein the conversion between the electric motor and the internal combustion engine is extremely simple and easy to accomplish.

The above object, as well as others which will hereinafter become apparent, is accomplished in accordance with the present invention by providing a motor driven mechanism, such as a pump for pressurizing paint for spray painting purposes, with a mechanism or system which permits conversion of the power source therefor between an electric motor and an internal combustion engine, each of which being capable of directly driving the motor driven mechanism. The mechanism or system for conversion of the power source includes a commonly shared clutch mechanism which is controlled such that the clutch is engaged and the motor driven mechanism, such as an airless paint pump, operated until the operating pressure level (of the paint) is reached at which time the clutch is disengaged so that the electric motor or internal combustion engine continues to run with no load thereon. The clutch mechanism utilizes a magnetic clutch and the clutch driven plate is non-rotatably connected to the pump input shaft while the clutch drive plate is non-rotatably connected to the motor or engine output shaft. The clutch drive plate is splined or keyed onto the engine or motor output shaft and is interchangeable between the output shafts of the electric motor and the internal combustion engine. The electromagnetic coil, when energized, magnetically draws the clutch drive plate towards the clutch driven plate and causes the two plates to engage with one another. The drive shaft of the electrical motor or I.C. engine, as the case may be, is thereby joined to the pump input shaft.

In order to control the energization of the coil of the magnetic clutch, since the power supply therefor can be either commercially available electrical energy when using an electric motor or a much reduced electrical energy generated by the internal combustion engine, special provisions are required. The coil is adapted to operate at the level of the electrical energy generated by the internal combustion engine and when the electric motor is utilized a control unit cuts off the current to the coil when it rises to the level of coil operation and as the current falls off a small amount, it allows the current to build again to the same level where it is cut off again. This cycle is repeated again and again so that the current does not get too high to destroy the coil.

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a perspective view of a portable hydraulic paint pump driven by an electric motor and incorporating the apparatus according to the present invention;

FIG. 2. is a perspective view of a portable hydraulic paint pump driven by an internal combustion engine and incorporating the apparatus according to the present invention;

Figure 1:
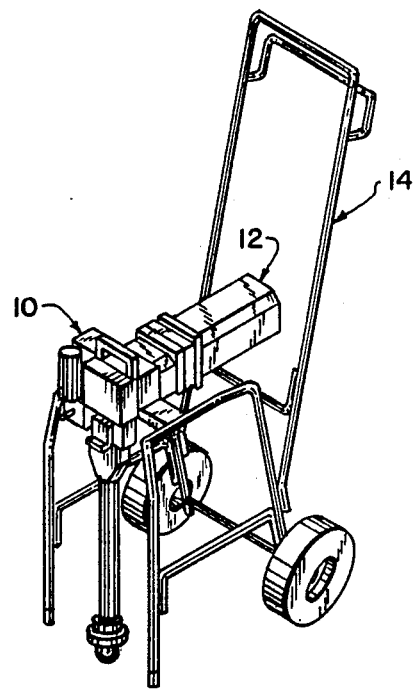
Figure 2:
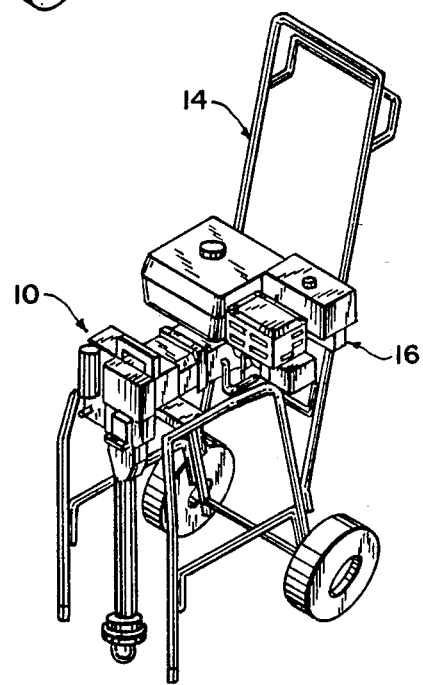
Figure 3:
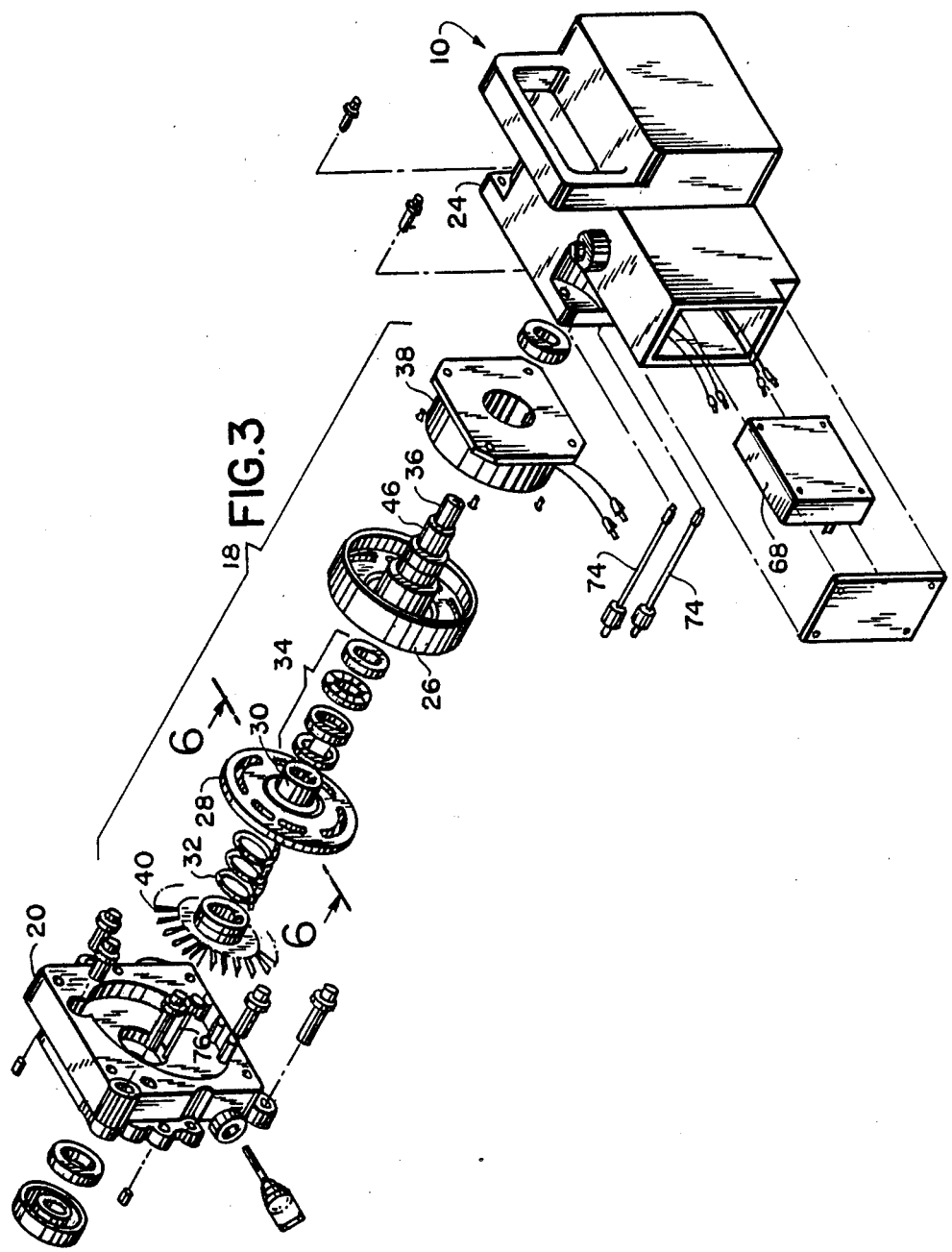
FIG. 3 is a perspective exploded view of the apparatus according to the present invention disposed between the internal combustion engine mounting plate and the hydraulic paint pump.
Figure 4:
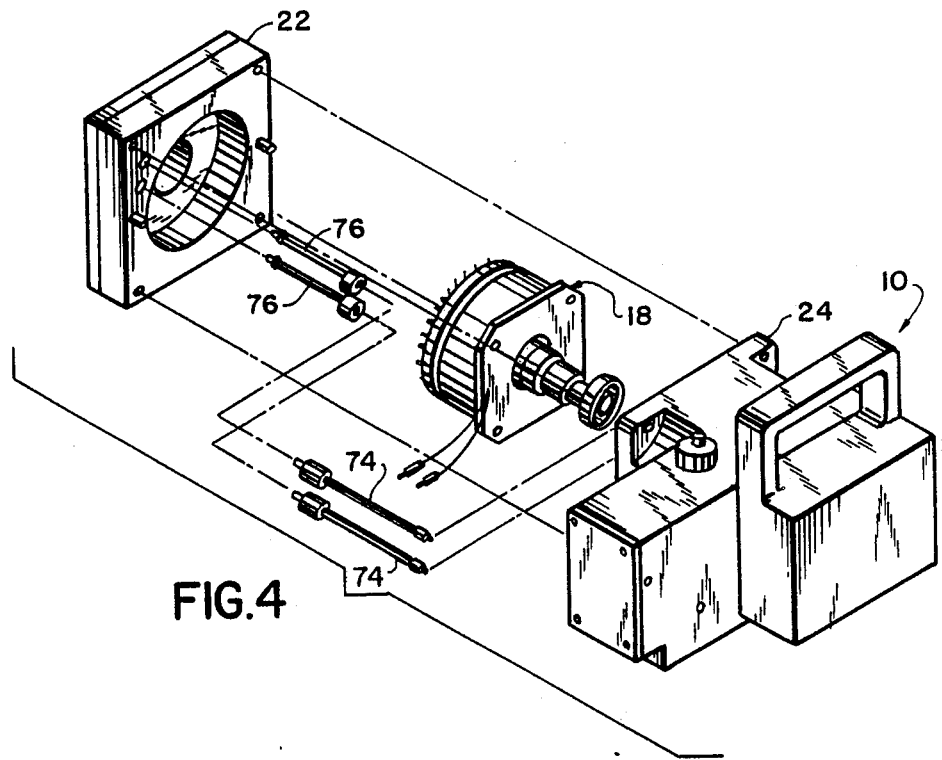
FIG. 4 is a partially exploded perspective view of the apparatus according to the present invention disposed between the electric motor mounting plate and the hydraulic paint pump.

Now turning to the drawings, there is shown in FIG. 1 a motor driven mechanism, such as a hydraulic paint pump, generally designated 10, directly driven by an electric motor, designated 12, and which is mounted on a wheeled cart 14, so as to be portable. In FIG. 2 there is also shown the same hydraulic paint pump 10 mounted on wheeled cart 14 for portability but which is powered or driven by an internal combustion engine 16. In FIGS. 3 and 4, there is shown the apparatus, generally designated 18, which permits the conversion of the power source for hydraulic paint pump 10 from electric motor 12 to internal combustion engine 16. As can be appreciated, the mounting faces of electric motor 12 and internal combustion engine 16, must be substantially alike in order to be mounted to the same hydraulic paint pump 10. Thus, as can be seen in FIGS. 3 and 4, both the internal combustion engine mounting plate 20 and the electric motor mounting plate 22 mount directly to mounting plate 24 of pump 10.

Apparatus 18, which permits conversion of the power source for hydraulic paint pump 10, consists of a driven clutch plate 26, a driven clutch plate 28 mounted on clutch hub 30, spring 32, a thrust bearing arrangement 34, a pump input shaft 36, an electromagnetic 38, and a cooling fan 40. As clearly seen in FIG. 5, when electric motor 12 or internal combustion engine 16, each having identical output shaft 42, is coupled with pump 10 so that their respective mounting plates 20 or 22 are flush with pump mounting plate 24, apparatus 18 is operatively arranged between output shaft 42 of motor 12 or engine 16 and the gear box 44 of pump 10. thus, when input shaft 36 is driven by output shaft 42, the drive gear 46 on shaft 36 drives gear 48 of gear box 44, which in turn drives gear 50, located on the commonm shaft with gear 48, which in turn drives gear 52, which drives the piston of pump 10. Input shaft 36 is non-rotatably connected to driven clutch plate 26 and until drive clutch plate 28 is engaged with driven clutch plate 26, input shaft 36 cannot move. As can be seen, clutch hub 30 is axially slideably and non-rotatably mounted on output shaft 42 by means of the engagement of key 52 of hub 30 in keyway 54 of output shaft 42. Drive clutch plate 28 is mounted by means 56 to clutch hub 30 so that drive clutch plate 28 is normally arranged at a fixed axial position on hub 30. Spring 32 biases hub 30 together with clutch plate 28 toward driven clutch plate 26 but because of thrust bearing arrangement 34, a clearance is maintained between the contact faces of clutch plates 26 and 28. However, although drive clutch plate 28 is mounted to clutch hub 30 so that it is normally in a fixed axial position thereon, it is resiliently mounted by means of a plurality of substantially radially extending leaf springs 58 which permit resilient movement in the axial direction of clutch plate 28 toward driven plate 26. In order to cause this axial movement of drive clutch plate 28 and the engagement of the faces of clutch plates 26 and 28, electromagnet 38, when energized, draws clutch plate 28 toward clutch plate 26 and holds them together by magnetism. Thus, when electromagnetic 38 is energized, output shaft 42 of motor 12 or engine 16 is directly connected to drive gear 46 of input shaft 36.

Figure 6:
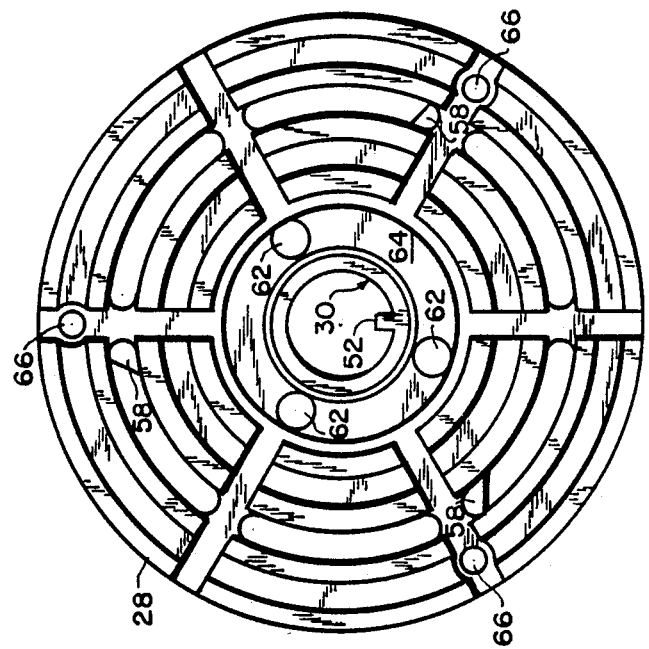
FIG. 6 is a plan view of the drive clutch plate utilized in the apparatus of the present invention.
Figure 7:
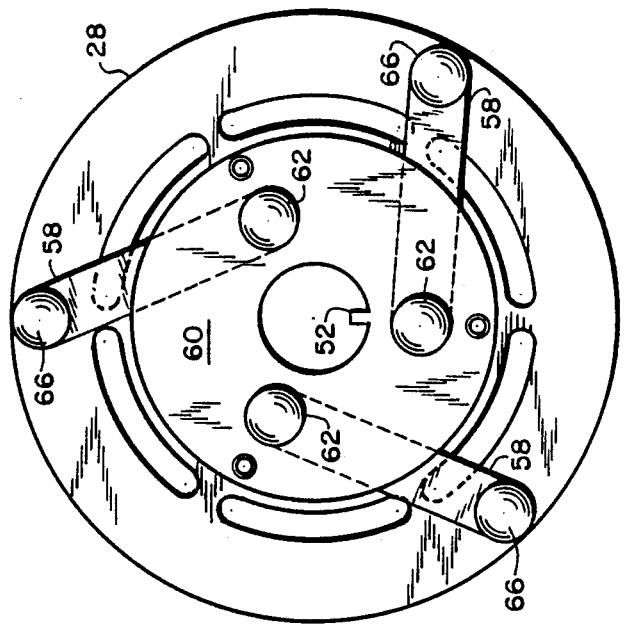
FIG. 7 is a plan view of the opposing side of the drive clutch plate shown in FIG. 6.
Figure 9:
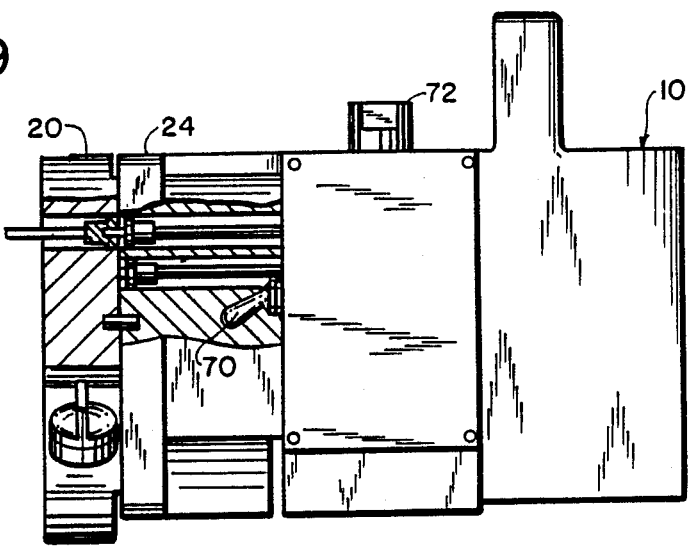
FIG. 9 is a view similar to that of FIG. 8, showing the electrical interconnections for the hydraulic paint pump of FIG. 2.
Figure 10:
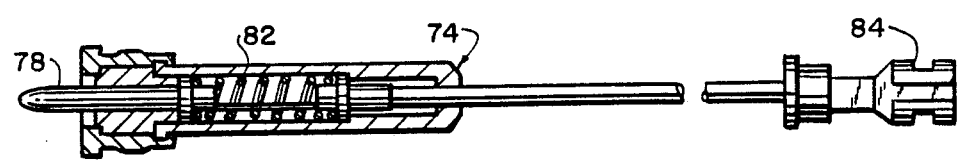
FIG. 10 is a partial cross-sectional view of the male electrical interconnecting contact shown in FIGS. 8 and 9.
Figure 11:
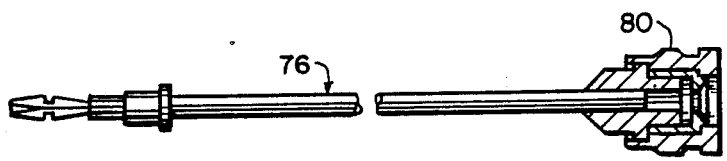
FIG. 11 is a partial cross-sectional view of the female electrical interconnecting contact shown in FIGS. 8 and 9.

The mounting of drive clutch plate 28 to clutch hub 30 is clearly shown in FIGS. 6 and 7, where clutch hub 30 is provided with a backing plate 60 which is riveted by means of inner rivets 62 to flange 64 of clutch hub 30. Leaf springs 58 are pinioned at rivets 62 between backing plate 60 and flange 64. The free ends of springs 58 are riveted by outer rivets 66 at the outer perimeter of clutch plate 28. As clearly seen in FIG. 7, the opposing ends of leaf springs 58 are angularly displaced or radially offset from each other in order to take advantage of the resulting greater length of the springs. The resiliency of leaf springs 58 permit a limited axial movement of clutch plate 28. Because of backing plate 60, this limited axial movement can only occur in the direction of clutch plate 26.

The electrical control system for energizing electromagnetic coil 38, is shown in FIGS. 8 to 12. As can be appreciated, electric motor 12 is adapted to operate on commercially available alternating current which is of a relatively high voltage of at least 120 volts. This relatively high voltage alternating current is also supplied to the control system for energizing coil 38. On the other hand, internal combustion engine 16 generates its own electrical current which is a relatively low voltage alternating current of the order of 12 volts. Thus, electromagnetic coil 38 is designed to operate on the relatively low voltage produced or generated by the internal combustion engine 16. Since coil 38 operates on relatively low voltage and at a direct current, it is necessary, in both instances, to rectify the current from alternating to direct and, in the case of the operation with the electric motor 12, it is also necessary to make a provision to reduce the voltage or the current so that the coil will not overheat and burnout. As clearly seen in FIG. 12, the input to control box 68 is taken from either electric motor 12 or internal combustion engine 16 through on/off switch 70 and the proper low voltage direct current fed to coil 38 to energize the same. Where a fluid pump is involved, such as a hydraulic paint pump 10, a pressure switch controls the operation of electromagnetic coil 38 and hence the operation of pump 10. Thus, at a predetermined low fluid pressure, coil 38 is engergized and at a predetermined high fluid pressure coil 38 is de-energized. Control box 68, in addition to rectifying the alternating current provided by motor 16 and engine 12, in order to supply direct current to coil 38, also functions to limit the current supplied to coil 38 from the commercially available source in order to prevent burnout of the coil by means of a switching current regulator. For example, where internal combustion engine 12 generates 12 volts A.C. and the commercially available relatively high voltage alternating current is 120 volts A.C., coil 38 will be designed to operate at 12 volts D.C. and at an amperage of 2.5 amps. When electric motor 12 is the power source for pump 10, the regulator in control box 68 cuts off the supply of current to coil 38 when the current in coil 38 has reached 2.5 amps so that the current falls off to 2.25 amps, at which point the regulator allows the current to coil 38 to build up to 2.5 amps again at which point the current is again cutoff and the cycle repeated. In this manner, the current supplied to coil 38 is never so great as to cause the coil to burnout and, thus, the one electromagnetic coil 38 can be utilized in the operation of both electric motor 12 and internal combustion engine 16.

Figure 8:
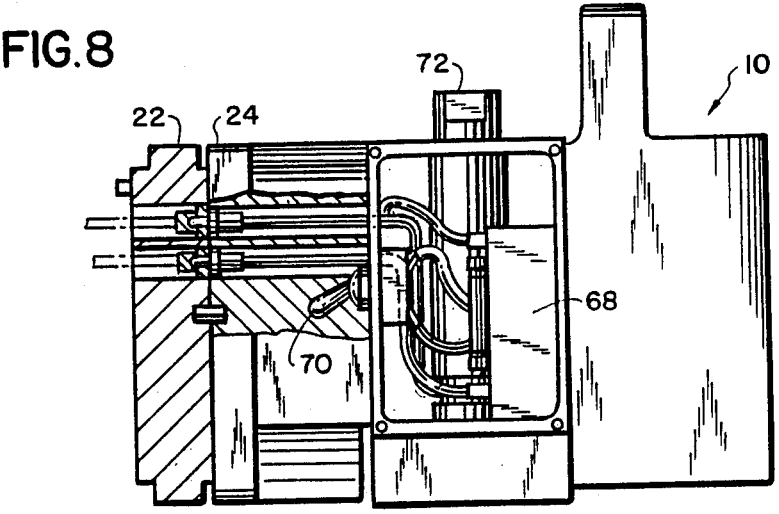
FIG. 8 is a partial cross-sectional view of the hydraulic paint pump of FIG. 1, showing the electrical interconnections therefor.
Figure 12:
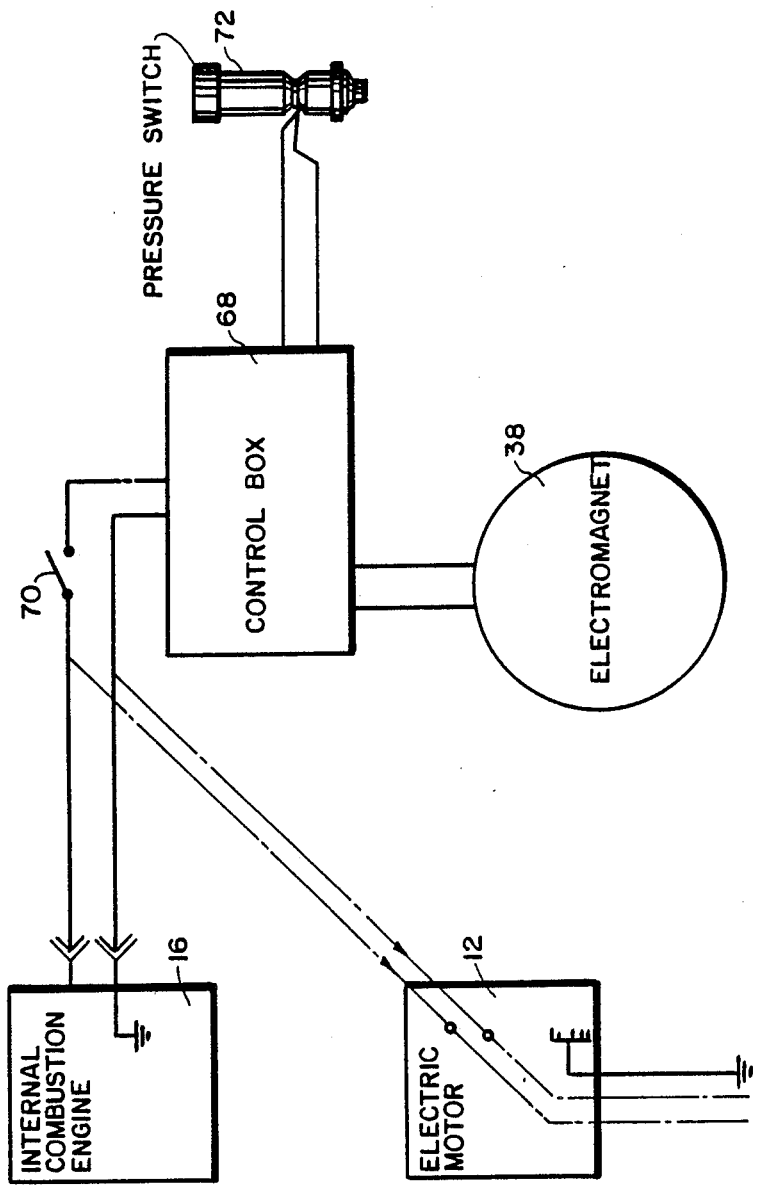
FIG. 12 is a diagram of the electrical control system for the apparatus according to the present invention.

The electrical connections between electric motor 12 and control box 68 can be seen in FIG. 8, wherein the electrical contacts between electric motor 12 and pump 10 are provided at the mating faces of mounting plates 22 and 24. These electrical contacts consist of a male electrical contact 74, seen in FIG. 10, and a female electrical contact 76, seen in FIG. 11. Two male electrical contacts 74 are fixed in pump mounting plate 24 so that contact pins 78 extend from the face of pump mounting plate 24. Two correspondingly located female electrical contacts 76 are positioned at the mounting face of electric motor mounting plate 22 so that their female contacts 80 are arranged at the face of plate 22. Thus, when mounting plates 22 and 24 are joined, as seen in FIG. 8, contact pin 78 of contact 74 extends into female contact 80 to establish an electrical connection therebetween. As clearly seen in FIG. 10, contact pin 78 is biased by spring 82 to extend from male electrical contact 74. When internal combustion engine 16, having mounting plate 20 with only one female electrical contact 76 arranged therein, is used, contact pin 78 of male electrical contact 74 faces a blank face of mounting plate 20 and is depressed against spring 82 to make electrical contact with mounting plate 20, which provides the ground for the generator of internal combustion engine 16. Male electrical contact 74 is provided at its end opposite contact pin 78 with electrical connector 84, which is connected by means of an electrical wire to on/off switch 70 or control box 68, as seen in FIG. 12.

Figure 5:
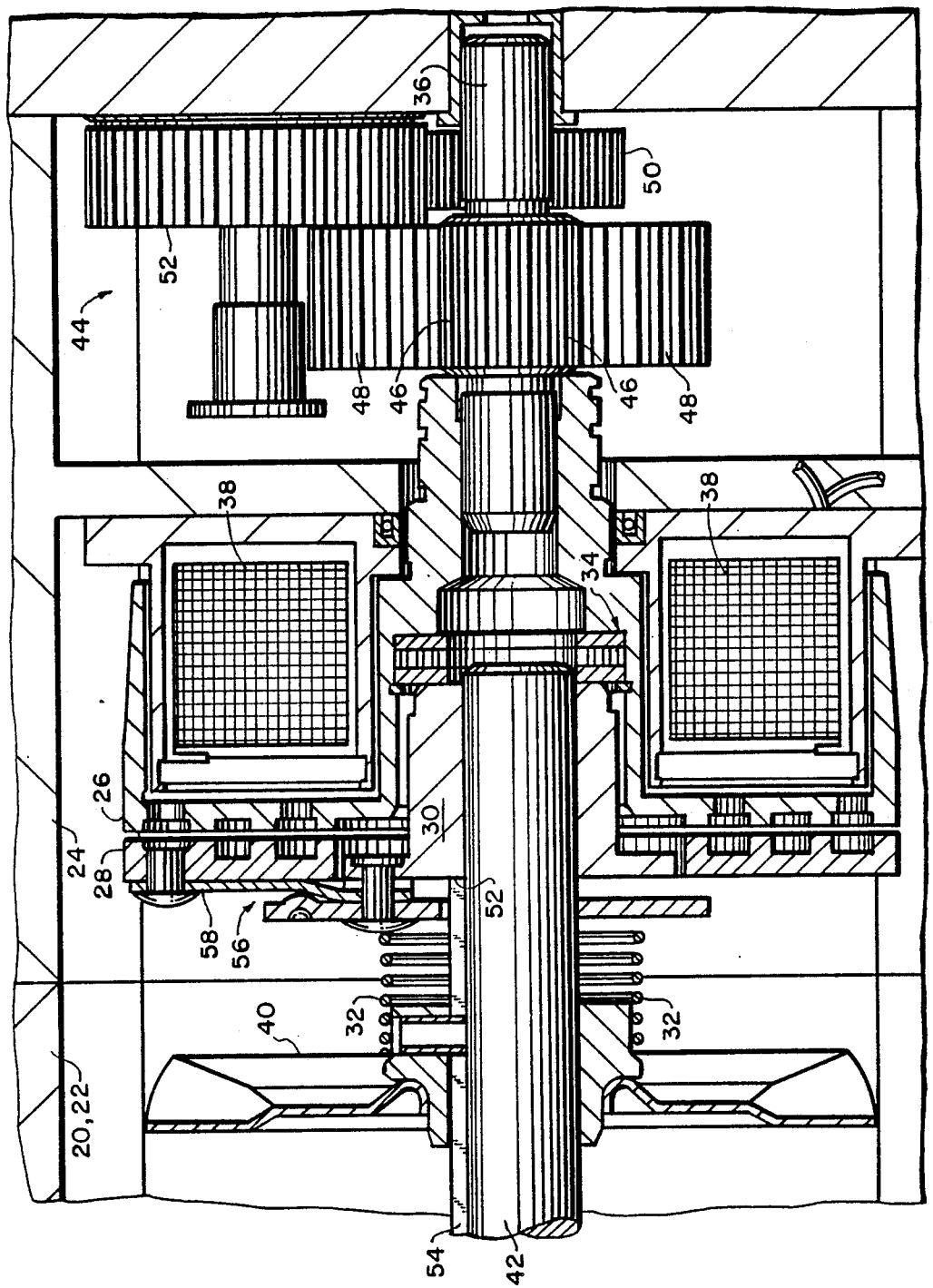
FIG. 5 is a cross-sectional view of the apparatus according to the present invention, driving the gear train of the hydraulic paint pump.

In the operation of the apparatus for conversion of the power source for a motor driven mechanism such as a hydraulic paint pump, when pump 10 is being operated together with internal combustion engine 16, which is constantly running, and on/off switch 70 is closed, pressure switch 72 is operable and if the pressure switch does not call for operation of pump 10, then electromagnet 38 is not energized and drive clutch plate 28 is spaced apart from driven clutch plate 26, as seen in FIG. 5. In this posture, output shaft 42 of engine 16 rotates, rotating clutch hub 30 and clutch plate 28, while driven clutch plate 26 and connected input shaft 36 are stationery. When the pressure of the fluid paint sensed by pressure switch 72 has reached a predetermined low, it calls for the energization of electromagnet 38 by its input to control box 68. Control box 68 therefore allows the 12 volt alternating current from the generator of internal combustion engine 16 to pass as a 12 volt D.C. current to coil 38, thus energizing the same and creating an electromagnetism. The magnetism produced by coil 38 draws rotating drive clutch plate 28 toward driven clutch plate 26 against the action of leaf springs 58 and causes the two clutch plates to engage with each other and be held firmly. In this manner, driven clutch plate 26 is rotated together with drive clutch plate 28, thus rotating input shaft 36 and drive gear 46. The rotation of drive gear 46 imparts a rotation to gear 52 which drives the piston of pump 10. When it is desired to operate pump 10 by means of electrical motor 12, internal combustion engine 16 is dismounted at the connecting faces of mounting plates 20 and 24 and output shaft 42, together with cooling fan 40 and clutch hub 30 are removed. Cooling fan 40, spring 32 and clutch hub 30 can then be repositioned on output shaft 42 of electric motor 12 in the same manner and electric motor 12 mounted at its mounting plate 22 to mounting plate 24 of pump 10. Again, electric motor 12 is in continuous operating and when it is desired to operate the pump, on/off switch 70 is switched to the on position and if the fluid paint pressure is sufficiently low, pressure switch 72 will call on control box 68 to energize coil 38. However, since the electrical power supplied to electrical motor 12 is at least 120 volts A.C., control box 68 permits the current in coil 38 to rise to 2.5 amps at which time control box 68 cuts the current and allows it to drop to 2.25 amps before allowing the current to again build up in coil 38 to the 2.5 amp cut-off. This cycle repeats itself continuously while pressure switch 72 calls for energization of coil 38. As in the case with the internal combustion engine, when coil 38 is energized, the magnetism produced thereby causes clutch plate 28 to move axially against the returning force of leaf springs 58 until it contacts driven clutch plate 26 with which it is magnetically coupled so that the rotating output shaft 42 thus drives input shaft 36 and gearbox 44 so that the piston of pump 10 reciprocates to increase the pressure of the fluid paint. When the paint has reached a predetermined upper pressure value, pressure switch 72 causes control box 68 to disconnect the electrical energy to coil 38 so that clutch plates 26 and 28 become disengaged and output shaft 42 rotates without any load on it.

While only a single embodiment of the present invention has been shown and described, it will be obvious that many changes and modifications may be made thereunto without departing from the spirit and scope of the invention.

What is claimed is:

1. Apparatus for use in combination with a motor driven mechanism, such as an airless spray paint pump, which permits the power source thereof to be converted between an electric motor and an internal combustion engine, wherein the respective output shafts of said electric motor and internal combustion engine are identical and when mounted to said motor driven mechanism are aligned with the input shaft thereof so as to directly drive the input shaft of the motor driven mechanism, said apparatus comprising:
    (a) a driven clutch plate fixedly connected to the input shaft of said motor driven mechanism;
    (b) a drive clutch plate;
    (c) a clutch hub axially displaceable and non-rotatably mounted on the output shaft of the electric motor or internal combustion engine;
    (d) means for mounting said driven clutch plate to said clutch hub so that said driven clutch plate is normally biased to a fixed axial position on said clutch hub and axially resiliently moveable relative to said clutch hub toward said driven clutch plate;
    (e) biasing means axially biasing said clutch hub on said output shaft toward the input shaft;
    (f) a thrust bearing arranged so as to permit a slight clearance between the faces of said drive and driven clutch plates when said clutch hub is biased toward the input shaft; and
    (g) activation means for causing said driven clutch plate to move axially relative to said clutch hub to close the clearance between said drive and driven clutch plates and non-rotatably engage said driven clutch plate.

2. The apparatus as defined in claim 1, wherein said activation means comprises an electromagnetic coil which when energized axially moves said drive clutch plate to close the clearance between said drive and drive clutch plates and magnetically engage said drive clutch plate with said drive clutch plate.

3. The apparatus as defined in claim 2, wherein said electromagnetic coil is arranged coaxially relative to said aligned output and input shafts.

4. The apparatus as defined in claim 2, wherein the electric motor power source operates on commercially available high voltage alternating current and the internal combustion engine itself generates a low voltage alternating current, and said magnetic coil is adapted to operate on direct current at the low voltage supplied by the internal combustion engine.

5. The apparatus as defined in claim 4, wherein the current for energizing said electromagnetic coil comes from the commercially available alternating current when the electric motor is the power sourece or the alternating current generated by the internal combustion engine when it is the power source.

6. The apparatus as defined in claim 5, which further comprises means for converting the alternating current from the commercially available source and the internal combustion engine to direct current for use by the magnetic coil, and a current limiting means which, when the commercially available alternating current is used, limits the current to the magnetic coil so that the average current in the magnetic coil is substantially the same as that when the internal combustion engine is used.

7. The apparatus as defined in claim 6, wherein the motor driven mechanism is an airless spray paint pump, and the apparatus further includes a pressure control switch which measures the pressure of the paint and at a predetermined low pressure causes the magnetic coil to be energized and at a predetermined high pressure causes the magnetic coil to be de-energized.

8. The apparatus as defined in claim 6, wherein the means for converting the alternating current from the commercially available source and the internal combustion engine to direct current comprises a rectifier.

9. The apparatus as defined in claim 6, wherein the current limiting means comprises a switching current regulator which cuts off the current to the magnetic coil when the current reaches a predetermined value and allows the current to build up again when the current has dropped to a predetermined value..

10. The apparatus as defined in claim 1, wherein the means for mounting drive clutch plate to said clutch hub comprises a plurality of leaf springs equally angularly displaced from one another and connected at one end at the radial outer limit of the drive clutch plate and at the other end to said clutch hub.

11. The apparatus as defined in claim 10, wherein the ends of each leaf spring are angularly displaced from one another.

* * * * *